(12) United States Patent
Alston

(10) Patent No.: US 8,393,171 B2
(45) Date of Patent: Mar. 12, 2013

(54) MECHANICALLY ENHANCED EJECTOR HVAC AND ELECTRIC POWER GENERATION SYSTEM

(76) Inventor: Gerald Allen Alston, Oakland, CA (US)

( * ) Notice: Subject to any disclaimer, the term of this patent is extended or adjusted under 35 U.S.C. 154(b) by 584 days.

(21) Appl. No.: 12/759,686

(22) Filed: Apr. 13, 2010

(65) Prior Publication Data

US 2011/0247351 A1    Oct. 13, 2011

(51) Int. Cl.
F25B 27/00    (2006.01)
(52) U.S. Cl. .................. 62/235.1; 62/323.1; 62/500
(58) Field of Classification Search .............. 62/235.1, 62/238.4, 238.6, 323.1, 500
See application file for complete search history.

(56) References Cited

U.S. PATENT DOCUMENTS

| | | | |
|---|---|---|---|
| 2,081,905 A | | 6/1937 | Ashley |
| 3,922,877 A | | 12/1975 | Ophir et al. |
| 4,309,877 A | | 1/1982 | Tawse |
| 4,378,785 A | * | 4/1983 | Fleischmann et al. ........ 126/584 |
| 4,765,148 A | | 8/1988 | Ohashi |
| 4,918,937 A | | 4/1990 | Fineblum |
| 5,647,221 A | | 7/1997 | Garris |
| 5,943,868 A | * | 8/1999 | Dietz et al. ...................... 62/107 |
| 6,138,457 A | | 10/2000 | Lackstrom et al. |
| 6,464,467 B2 | | 10/2002 | Sullivan et al. |
| 6,729,157 B2 | | 5/2004 | Oshitani et al. |
| 7,178,359 B2 | | 2/2007 | Oshitani et al. |
| 7,254,961 B2 | | 8/2007 | Oshitani et al. |

OTHER PUBLICATIONS

Gerald Allen Alston, "Heat-Powered Vehicle Cabin temperature Control System", U.S. Appl. No. 61/176,063, filed May 6, 2009.
Jorge I. Hernandez, "Study of a Solar Booster Assisted Ejector Refrigeration System with R134a", Journal of Solar Engineering, Feb. 2005, vol. 127.
M. Sokolov, "Compressor Enhanced Ejector Refrigeration Cycle for Low-Grade Heat Utilization", IEEE 899068 CH2781, Mar. 1989.
Szabolcs Varga, "Analysis of a solar-assisted ejector cooling system for air-conditioning", International Journal of Low-Carbon Technologies Apr. 2-8, 2009.

* cited by examiner

*Primary Examiner* — Melvin Jones

(57) ABSTRACT

An HVAC system that uses a mechanical compressor powered by vaporized refrigerant and/or electric power, to increase efficiency in a jet ejector cooling cycle. The device is further able to convert thermal energy to electric power which may be used to meet internal or external requirements, for example, to activate control a system or charge a battery. Compatible input power includes only thermal energy, only electric energy or a combination of the two. Motive thermal energy may be input at a wide range of temperature and include both waste and non-waste heat sources such as that from an internal combustion engine and fuel-fired heater. Solar thermal and solar photovoltaic may also be used when collected from either concentrated or non-concentrated sources. Embodiments of the device are equally well suited to both mobile and stationary applications.

36 Claims, 10 Drawing Sheets

MECHANICALLY ENHANCED EJECTOR HVAC AND ELECTRIC POWER GENERATION SYSTEM

CROSS REFERENCE TO RELATED APPLICATION

None

FEDERALLY SPONSORED RESEARCH

None

SEQUENCE LISTING OR PROGRAM

None

BACKGROUND

1. Field

This application relates to a system which provides heating, air-conditioning and electrical power generation, specifically to such a system which incorporates a mechanically-enhanced vapor ejector compressor and is powered from thermal input energy.

2. Prior Art

The ability to accurately control the air temperature of human occupied compartments is highly desirable for personal comfort in all situations and a serious matter of safety in some. Because heating and air conditioning are energy-intensive, the financial and environmental cost to provide this temperature control is almost entirely determined by the efficiency of the heating, ventilation and air-conditioning (HVAC) equipment and cost of the energy that is used to power it. For a manufacturer of HVAC systems, it would seem logical to address the largest possible market by creating an HVAC system which can be powered by the common, and lowest cost, sources of input energy.

In the prior art in can be seen that, rather than this "universal" energy approach, most HVAC systems are designed instead around the concept of highly specialized optimization. While this highly specialized approach works well when all of the initial design considerations are stable, these systems are often difficult to adapt to new conditions. When operating requirements, energy sources, energy cost and the legal environment change HVAC system that had previously been excellent solutions become costly, awkward and ineffectual.

An excellent example of this can be seen in the prior art for long-haul truck HVAC systems. For many years, these input power for these systems was an engine-driven compressor for air conditioning and waste heat from the propulsion engine for heating. These engine-driven compressor put additional load on the engine and increase the fuel consumption. When the cost of fuel was relatively low, this was not a burden and the approach worked well. However, in recent years, fuel costs have dramatically increased and new legislation prevents trucks from idling their engines to provide HVAC at rest stops. The prior art of the engine-driven cooling system and waste engine heat heating system cannot be adapted to meet these new conditions. To meet the new requirements, truck manufacturers have to install an additional HVAC system which is operational only at the rest stops when the engine is off. As with other prior art, these "no-idle" HVAC solutions are highly specialized for their application and typically either consume a large amount of liquid fuel or require large batteries to supply a limited amount of operating time. These characteristics make them unsuitable for use in the normal engine running condition of on-highway operation. As a result, truck manufacturers of today are generally required to provide two separate HVAC system on every long-haul truck—one for on-highway use and one for no-idle rest stop use. The two system approach is both expensive and highly fuel intensive.

As the cost of energy increases and the environmental impact of harnessing that energy increases in relevance, it has become increasing desirable to develop an HVAC system which consumes less energy. The energy that powers the new system should be as flexible and as universally available as possible. Finally, the ideal system should always be able to use the energy source which is the lowest in cost and environmental impact. In many applications, the energy source which best meets these requirements is waste heat captured from surrounding processes. Unfortunately, past systems designed to be so powered have suffered from serious deficiencies. One known heat-powered cooling technology is the steam jet or "ejector" compressor. Cooling systems based on ejectors were developed by Ashley, U.S. Pat. No. 2,081,905 (1937) and others and were common on steam-power trains. While the energy efficiency of these systems is poor extremely poor and, for this reason as well as others, they are not commonly used today in non-industrial settings.

Ophir et al, U.S. Pat. No. 3,922,877 (1975) attempted to adapt this technology for use in automobiles by using waste heat from the internal combustion propulsion engine to boil a refrigerate to supply the motive fluid. In such systems, the amount of energy available to power the cooling system was determined solely by the amount of heat given off from the engine as no other source of heat was supplied. This presents a serious problem since a car idling in traffic may have a very high cooling requirement but very little waste engine heat available to provide that cooling. The irreconcilable disconnect between the amount of motive energy reliably available and the amount of cooling which may be required, as well as the low coefficient of performance (COP) suffered by the Ashley invention, made such systems unreliable and limited their commercial success.

One way to partially overcome the limitations of waste heat-powered systems is to increase their efficiency. Ohashi, U.S. Pat. No. 4,765,148 (1988) sought to improve the performance of ejector cooling systems by using a working fluid composed of two or more refrigerants of different saturation temperatures. Other attempts to increase efficiency were made Garris U.S. Pat. No. 5,647,221 (1997) and others who focused on achieving this through the creation of a superior ejector design. Tawse, U.S. Pat. No. 4,309,877 (1982) took a different approach by creating a co-generating total energy system incorporating an ejector cooling system which improved output stability by using waste heat supplied from multiple sources. In all these designs, several serious problems remained including a low COP and the inability to supplement waste heat with non-waste heat energy sources. Without the ability to supplement waste heat with other sources of energy, these systems become completely non-functional when waste heat is unavailable or when it is not available in insufficient quantity to meet the full input requirement of the system.

While early work improved the performance of ejector-based cooling, the COP of these systems continued to lag far behind that of both electrically-powered Rankin Cycle and heat-power absorption systems. In 1989 M. Sokolov ("Compressor Enhanced Ejector Refrigeration Cycle For Low-Grade Heat Utilization", IEEE 899068 CH2781) presented a system which combined an ejector compressor with an electrically-powered compressor. When provided with the right combination of waste heat and electrical power, the approach worked extremely well and improved the COP of the ejector system to the point where it exceeded that of typical absorption technology. However, as with the systems that predated it, no provision was made to supplement the waste heat from non-waste energy sources. Similarly, the functional relationship between the electric boost compressor and the waste heat-powered ejector compressor was fixed thereby limiting the possibility of widely varying that portion of the total input power which came from each source.

Continued research on this approach by Henandez (Study of a Solar Booster Assisted Ejector Refrigeration System with R134a", Journal of Solar Engineering, February 2005, Volume 127) and Varga ("Analysis of a solar-assisted ejector cooling system for air conditioning", International Journal of Low-Carbon Technologies 4 2-8, 2009) further demonstrated that a combination of ejector and mechanical compressors could be used to more efficiently extract cooling capacity from waste heat. My own provisional Alston U.S. patent Ser. No. 61/176,063 (2009) further improves on an ejector and electric mechanical compressor system through improved control and other techniques. Unfortunately, all of these systems required both waste heat and electrical input energy. They cannot be powered from only from waste and/or non-waste heat and cannot generate their own electric power. Therefore, they must ultimately always have an external source of electric power for the compressor, fans, controls and other necessary electricity consuming components.

Fineblum, U.S. Pat. No. 4,918,937 (1990) offered the efficiency advantages of a mechanically-boosted ejector system but reduced the electrical energy requirement by using an engine-driven mechanical compressor rather than an electrically powered one. Oshitani et al., U.S. Pat. Nos. 6,729,157 (2004), 7,178,359 (2007) and 7,254,961 (2007) offered similar systems combining both ejector and engine-driven compressors in a manner which provided particular benefit for CO2-based vehicle air conditioning systems. However, these systems, like all other ejector-mechanical systems in the prior art, still require at least one non-heat source of input energy. Additionally, all require at least some amount of electrical power, none of them can use heat to generate that power.

Therefore, it can be seen that, unlike the invention which is the subject of this application, all heretofore known mechanically-boosted ejector compressor HVAC systems suffer from one or more disadvantages which limit their application and commercial usefulness in that they;

(a) cannot use thermal energy to power the boost compressor.
(b) require an external source of electrical power for mechanical compressors, heat exchanger fans, liquid pumps, control systems, flow control valves and/or electromagnetic clutches.
(c) have no means of supplementing the waste heat energy with input from a non-waste heat source.
(d) provide no means to maximize the system efficiency by modifying the boost relationship between the ejector and mechanical compressors.
(e) cannot use waste heat energy to recharge the system electric storage battery.
(f) do not provide for multiple cooling zones through independent heat exchangers.
(g) have no provision for a separate liquid cooling loop that would allow systems using high pressure or otherwise hazardous refrigerants to be entirely located outside the cooling compartment.
(h) have no means of redirecting excess waste heat-generated electrical power to applications outside the HVAC system.
(i) do not provide for a vapor-powered engine-driven mechanical ejector boost compressor or the ability to optimize the efficiency of such a compressor by adjusting the vapor inlet and discharge valve timing.
(j) do not provide for a vapor-powered engine-driven electrical power generator or the ability to optimize the efficiency of this generator by adjusting the vapor inlet and discharge valve timing.
(k) have no means of mechanically engaging and disengaging a vapor-powered engine, an electrical motor/generator and a mechanical compressor from each other in a way that allows multiple drive combinations while eliminating the friction drag of an unneeded device.
(l) do not have a control circuit which adjusts the speed of the condenser fan to eliminate excess energy consumption.
(m) do not continuously optimize the system high-side pressure by adjusting the rate of flow of liquid refrigerant into the boiler.

SUMMARY

The subject invention overcomes the disadvantages of the prior art by providing a mechanically enhanced ejector HVAC and electric power generation system which may be operated solely from thermal energy input, solely from electrical energy input or any combination of the two.

DRAWINGS

Figures

In the drawings, closely related figures have the same number but different alphabetic suffixes.

DRAWINGS - Reference Numbers

| | |
|---|---|
| 1 | High temperature loop |
| 2 | Vapor engine compressor-generator |
| 3 | Power and control system |
| 4 | Direct expansion cooling loop |
| 5 | Two-way vapor flow control |
| 6 | Ejector compressor |
| 7 | Heat exchanger/muffler |
| 8 | Refrigerant pump |
| 9 | Combustion air fan |
| 10 | Fuel-fired hydronic heater |
| 11 | Heater fan |
| 12 | Condenser |
| 13 | Condenser fan |
| 14 | Inlet control |
| 15 | Vapor expander |
| 16 | Discharge control |
| 17 | Inlet valve |
| 18 | Boost compressor |
| 19 | Discharge valve |
| 20 | Liquid refrigerant receiver |
| 21 | Sub-cooling heat exchanger |
| 22 | Internal combustion engine |
| 23 | Liquid-air heat exchanger |
| 24 | High temperature circulation pump |
| 25 | Expansion tank |
| 26 | Electric heater |
| 27 | Motor-generator |
| 28 | Drive shaft |
| 29 | Shaft clutch |
| 30 | Refrigerant flow control |
| 31 | Alternator |
| 32 | Refrigerant evaporator |
| 33 | Cooling fan |
| 34 | Utility grid |
| 35 | Intelligent power control system |
| 36 | Electrical power storage |
| 37 | Intelligent device control system |
| 38 | Refrigerant evaporator |
| 39 | Expansion tank |
| 40 | Low temperature circulation pump |
| 41 | Liquid-air heat exchanger |
| 42 | Three-way liquid flow control |
| 43 | Boiler |
| 44 | Liquid cooling loop |
| 45 | Speed reducer/increaser |

DETAILED DESCRIPTION

FIG. 1, FIG. 1A and FIG. 3 through 5—First Embodiment

Figure 1:
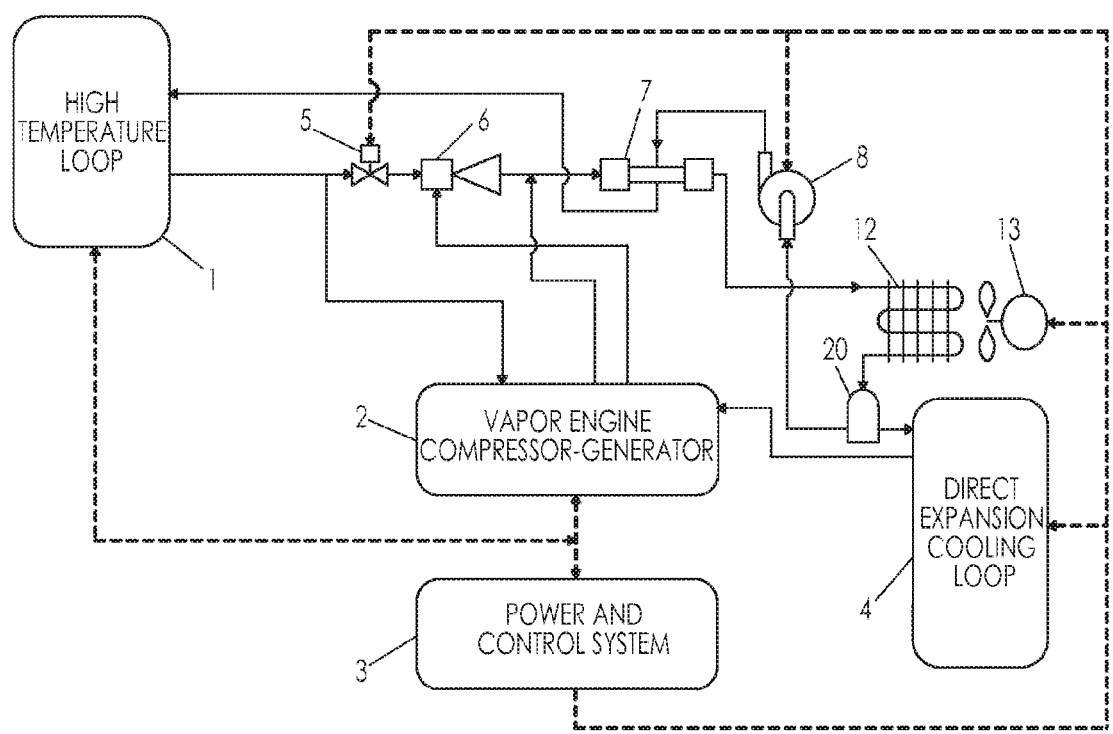
FIG. 1 is a block diagram of a first embodiment of a Mechanically Enhanced Ejector HVAC and Electric Power Generation System.
Figure 1A:
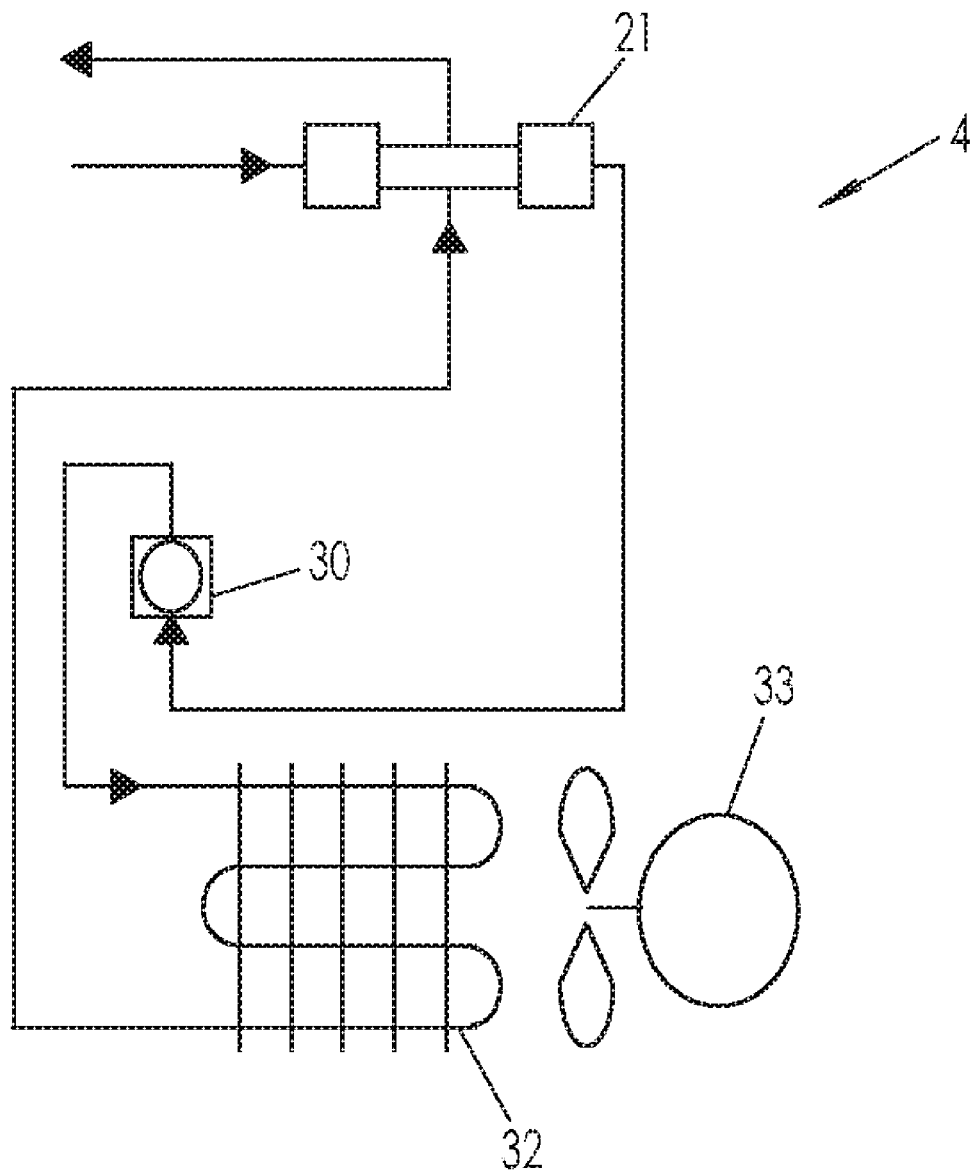
FIG. 1A is a block diagram of a single zone Direct Expansion Cooling Loop according to the first embodiment.
Figure 3:
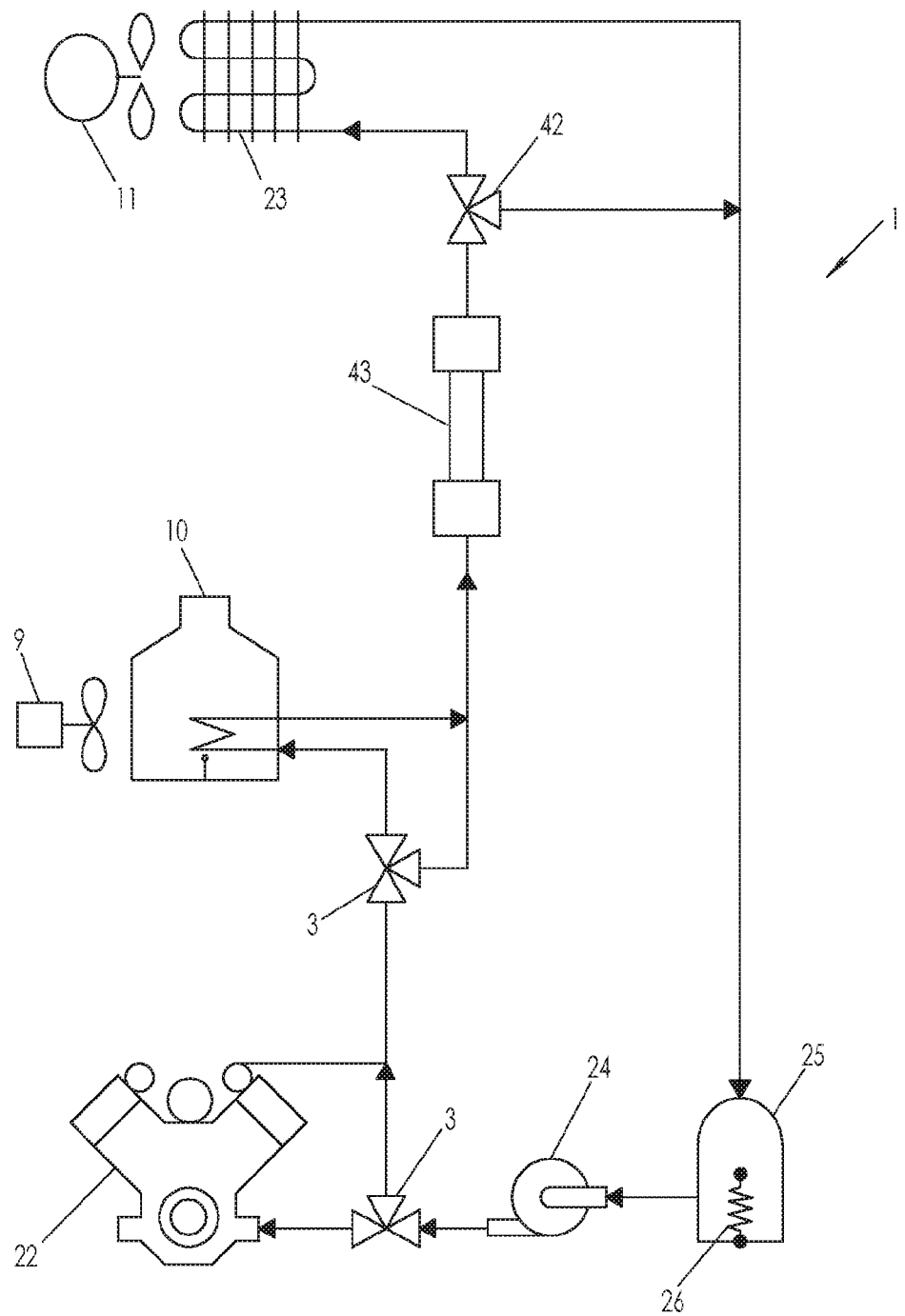
FIG. 3 is a block diagram of a first embodiment of a High-Temperature Loop.
Figure 4:
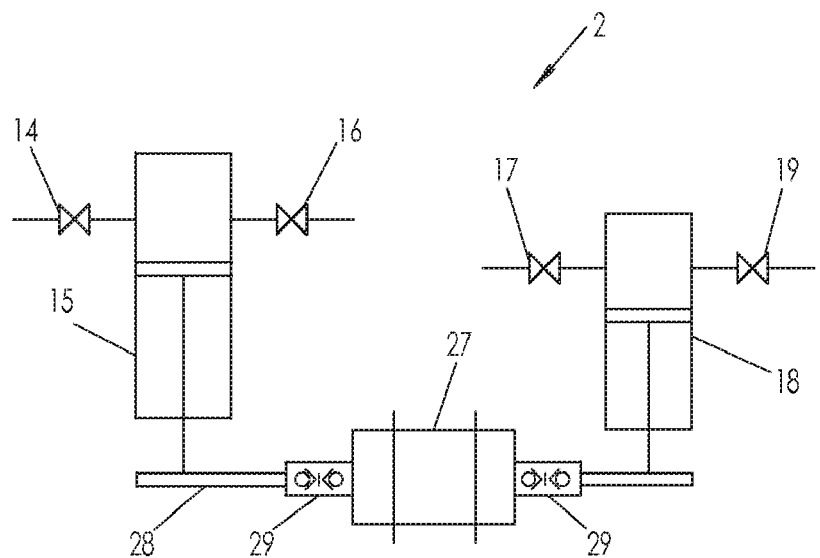
FIG. 4 is a block diagram of one type of Vapor Engine Compressor-Generator.
Figure 5:
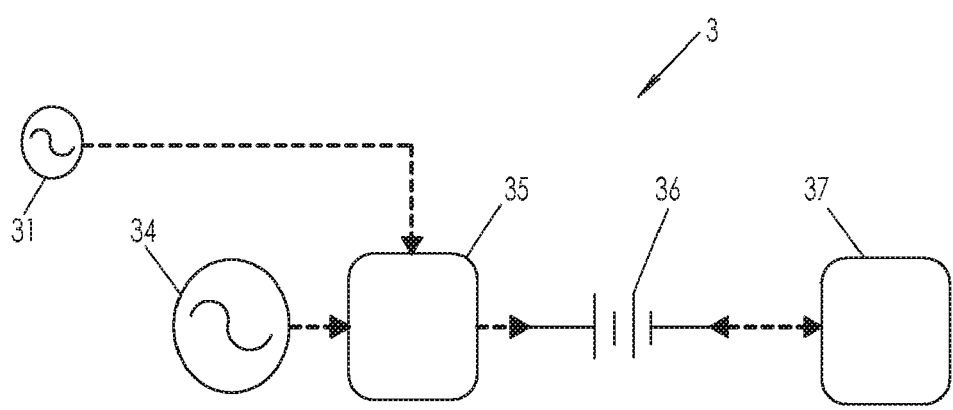
FIG. 5 is a block diagram of a Power and Control System.

One embodiment of a Mechanically Enhanced Ejector HVAC and Electric Power Generation System is illustrated in FIG. 1 and includes first embodiments of a High Temperature Loop as shown in FIG. 3, a Vapor Engine Compressor-Generator as shown in FIG. 4, a Direct Expansion Cooling Loop as shown in FIG. 1A and a Power and Control System as shown in FIG. 5. Motive thermal energy is collected and distributed in the High Temperature Loop 1 which consists of a heat transfer fluid such as a 50/50 mixture of water and propylene glycol, circulated by the high temperature circulation pump 24 which is typically a centrifugal pump magnetically a permanent magnet variable speed brushless DC motor, so as to transfer heat between multiple heat exchangers. Heat enters the heat transfer fluid from sources of waste heat such as the cooling circuit and exhaust system of an internal combustion engine 22 and supplemented, when required, by additional heat from a fuel-fired hydronic heater 10 such as those supplied by Webasto, Eberspacher and others. Combustion air is supplied to this heater by fan 9 which works cooperatively with the heater fuel supply to maintain the correct fuel-air ratio. Ideally, the heater has a variable capacity to exactly produce the amount of heat required by the system. However, it may also operate in an on/off mode and store heat in the fluid of the high temperature loop. Electronically controlled three-way liquid flow controls 42 are used to allow the heat transfer fluid to be directed through or around various heat collecting heat exchangers in the circuit. The heated heat transfer fluid flows through boiler 43 which may be of a tube-in-tube, tube-in-shell or other commonly known type. An additional three-way liquid flow control 42 directs heat transfer fluid either through or around liquid-air heat exchanger 23, which is positioned in a manner so that a high efficiency, variable-speed heater fan 11 as sold by SPAL USA may circulate air from an occupied compartment across the coil thereby providing heat to the space. To facilitate positioning and to minimize cost, liquid-air heat exchanger 23 may be co-located, and/or integrally manufactured with, refrigerant evaporator 32 and may combine the functionality of heater fan 11 and cooling fan 33 in a single device. Expansion tank 25 is located in line with the circulating heat transfer fluid and directs the fluid over electric heater 26 which is an immersion type resistance heater.

The Power and Control System shown in FIG. 5 consists of an intelligent power control system 35 which controllably receives electric power from one or more sources including an alternator 31 which is driven by the internal combustion engine 22 and the utility grid 34. It further includes a bi-directional electrical connection capable of supplying electric power to, and receiving electric power from, a motor-generator 27 and a multi-cell lithium ion battery providing electrical power storage 36. Additionally, the intelligent power control system 35 ensures that sufficient electric power is available to electric energy consuming devices including heater fan 11, three-way liquid flow control 42, cooling fan 33, two-way vapor flow control 5 and a positive displacement, a magnetically coupled, permanent magnet variable-speed refrigerant pump 8 and high temperature circulation pump 24, both of which may be supplied by Fluid-O-Tech srl and others. An intelligent device control system 37 communicates and interacts with the intelligent power control system 35 to provide real time regulation of the flow of electrical power to all controllable subsystems and devices continuously optimize system performance in accordance with pre-programmed and user programmable preferences.

The inlet control 14 is a suitably fast responding, electronically controlled valve which regulates the flow of high pressure vaporized refrigerant into the vapor expander 15 to allow the inlet vapor to optimally expanded before discharge. Vapor expander 15 is of a reciprocating piston type but may be of a different type in various embodiments. The discharge of the expanded gas is regulated by an electronically variable discharge control 16 which is similar in type to inlet control 14 but sized to handle the increased flow volume of the expanded gas. Upon discharge, the expanded gas flow through a heat exchanger/muffler 7 which is typically a tube-in-shell type heat exchanger sized to ensure minimum pressure drop for the gas side and which is further sized to minimize the noise generated by the flowing gas. Since, in some operation conditions, heat exchanger/muffler 7 additionally acts as a boiler, its ultimate design must also accommodate this function.

Drive shaft 28 mechanically connects and transfers mechanical energy between vapor expander 15 to a motor-generator 27 through a shaft clutch 29 which is available through Boston Gear, Mass., USA and others and may be either electronically or mechanically controlled to operably couple and decouple the vapor expander 15 from the motor-generator 27. Motor-generator 27 is typically a permanent magnet brushless type but may be a different type such as a synchronous wound rotor type in other embodiments. It is sized to have a motor mechanical output capacity sufficient to handle the maximum load presented by the boost compressor 18 and to further have, a generator electric output capacity sufficient to fully supply the peak electric input power requirement of the intelligent power control system 35 when the system is operating solely from thermal input energy. Drive shaft 28 further mechanically connects motor-generator 27 to boost compressor 18 through a second shaft clutch 29 which may be electronically or mechanically controlled to operably couple and decouple boost compressor 18 from motor-generator 27.

Boost compressor 18 is a reciprocating refrigerant compressor but may be of another type in various embodiments and is of sufficient size to provide all required vapor compression without the aid of an ejector compressor 6. Inlet valve 17 and discharge valve 19 are reed type check valves as typically found on reciprocating gas compressors. Vapor expander 15 is of a reciprocating type but may be of another type in various embodiments and is sized so as to be capable of producing sufficient mechanical power to functionally rotate boost compressor 18 while under maximum load and to simultaneously supply motor-generator 27 with sufficient torque and speed to generate all electric power required for self-sustaining operation when the system is operating solely from thermal input energy.

Ejector compressor 6 may be manufactured according to Raizman et al. U.S. Pat. No. 5,087,175 and others or may be purchased through Fox Valve, N.J., USA and other vendors. Minimum size and maximum performance is obtained when Condenser 12 is of the aluminum microchannel parallel flow type although other suitable sized refrigeration condensers may be used. Receiver 20 may be constructed of any suitable material capable of meeting the maximum operating pressure of the system with a suitable margin of safety. The size will be influenced by the final system installation and should be sufficient to contain the entire refrigerant charge volume. Condenser fan 13 is a typically a tube-axial impeller powered by a high efficiency, environmentally sealed, variable-speed permanent magnet motor.

Direct Expansion Cooling Loop FIG. 1A includes a sub-cooling heat exchanger 21 as supplied by Refrigeration Research, Mich., USA and others. Refrigerant flow control 30 is selected based on cooling capacity and operating requirement of the system and is typically an electronic stepper expansion valve as is commonly known to the industry. Refrigerant evaporator 32 is optimally of the flooded microchannel type but may be of any common type known to the industry. It may, or may not be co-located and/or integrally manufactured with liquid-air heat exchanger 23. Cooling fan 33 may be a tube axial, forward impeller or backward impeller blower which is powered by a high efficiency, variable-speed permanent magnet brushless DC motor and may be purchased from EBM Fan or others.

Operation

FIGS. 1, 1a, 3, 4, 5, 7 and 8—First Embodiment

Input energy may enter the system as heat, electric power or a combination of both. In the High-Temperature Loop shown in FIG. 3, a high temperature circulation pump 24 circulates a suitable heat transfer fluid, such as a 50/50 mixture of propylene glycol and water, within a closed loop. Upon activation of the system, elements of a Power and Control System as shown in FIG. 5 analyze and prioritize the available input power sources according to Table 1. As appropriately determined, a three-way liquid flow control 42 directs the fluid through or around an internal combustion engine 22, where the fluid may collect waste heat emitted from the cooling system and exhaust system. A second three-way liquid flow control 42 directs the fluid through or around a fuel-fired hydronic heater 10, a non-waste heat thermal source, which includes a combustion air fan 9 to oxygenate and combust a liquid or gaseous fuel to further increase the temperature of the circulating fluid to a desired point. Depending on the operating conditions, system load and other factors, a system using R410a as a refrigerant, the circulating heat transfer fluid would typically be heated to between 80 C. and 120 C.

TABLE 1

THERMAL SOURCE PRIORITIZATION
LOGIC BY APPLICATION

| SOURCE | MOBILE VEHICLE PRIORITY | LAND-BASED PRIORITY |
|---|---|---|
| Waste heat | 1 | 1/2 |
| Utility grid connection (resistance heat) | 4 | 5 |
| Gas-fired boiler | 2/3 | 3/4 |
| Liquid fuel-fired hydronic heater | 2/3 | 3/4 |
| Generated by system from fuel-fired heat | 5 | 5 |
| Solar thermal | N/A | 1/2 |

The circulating fluid, now having been optimally heated to a temperature regulated by an intelligent device control system 37, flows through boiler 43. A third three-way liquid flow control 42 controls the heating mode by directing the fluid exiting the boiler through or around a liquid-air heat exchanger 23 where a heater fan 11 circulates air to heat a temperature controlled compartment. The circulating heat transfer fluid then enters an expansion tank 25 which allows any accumulated bubbles to settle and safely accommodates the change in volume of the circulating fluid due to expansion and contraction, The fluid next flows past an electric heater 26 which may, under certain conditions, provide supplemental thermal energy in a manner consistent with Table 1. Finally, the fluid returns to the inlet of the high temperature circulation pump 24 to complete the High Temperature Loop shown in FIG. 3.

The Mechanically Enhanced Ejector HVAC and Electric Power Generation System shown in FIG. 1, when viewed in conjunction with the Direct Expansion Cooling Loop shown in FIG. 1A and the Vapor Engine Compressor-Generator shown in FIG. 4, show the refrigerant path. Virtually any chemically compatible refrigerant may be using including fluorocarbon and hydrocarbon based products, water or other single-component refrigerants such as CO2. The refrigerant R-410 is one recommended refrigerant because it provides, reasonable operating pressures, good efficiency and allows the size of many of the components of the system to be minimized.

Heat enters the refrigerant loop from the High Temperature Loop 1 through boiler 43. Liquid refrigerant entering boiler 43 vaporized and expands thereby creating a first high-side pressure. In a system using R410a as a refrigerant, the first high-side pressure might typically range between 500 and 1000 psi depending on the temperature and operating condition of the thermal input sources and the load placed on the system. Fluctuations in the first high-side pressure can effect the overall efficiency and capacity of the system. To minimize the negative impact of these fluctuations, the intelligent device control system 37 may modify the distribution of refrigerant to various devices according to the principle shown in FIG. 7. The distribution may be modified in several ways including, the opening or closing of two-way vapor flow control 5 and inlet flow control 14, by changing the operating speed of vapor expander 15 and by altering the load on vapor expander 15 by adding or removing electrical power from motor-generator 27.

Heated vapor at said first high-side pressure two paths. The first path flows through two-way vapor flow control 5 which regulates the flow to ejector compressor 6. The second path flows through inlet control 14 which regulates the flow to a vapor expander 15. Under certain operating conditions, such as when all input power is in the form of electricity provided by the utility grid 34, intelligent device control system 37 may close either one or both of two-way vapor flow control 5 and inlet control 14 to modify, or cut off entirely, the flow of refrigerant vapor. Under other operating conditions, such as when no cooling is required, intelligent device control system 37 fully closes two-way vapor flow control 5 to stop the flow of motive fluid to ejector compressor 6, and modulates the opening and closing of inlet control 14 to optimize the work product of vapor expander 15 and the electrical output of motor-generator 27. Under yet another operating condition, such as when cooling is required and some or all of the system input energy is thermal, intelligent device control system 37, optimally regulates the flow of vapor to both vapor expander 15 and ejector compressor 6 according to the principle shown in FIG. 7.

Referring again to the Vapor Engine Compressor-Generator shown in FIG. 4, refrigerant vapor at the first high-side pressure controllably enters said vapor expander 15 through said inlet control 14 and is allowed to expand to the extent optimally required to produce the needed mechanical power with minimum vapor consumption. Once expanded, the refrigerant vapor controllably exists through discharge control 16 at a second high-side vapor pressure, this second high-side vapor pressure being lower than the first high-side vapor pressure. As part of a control strategy, intelligent device control system 37 adjusts the duration of the open period of inlet control 14 and discharge control 16 so as to continually optimize the efficiency of vapor expander 15 while still producing the required output torque.

Output torque from vapor expander 15 is transferred to drive shaft 28, and further, is controllably transferred to motor-generator 27 via shaft clutch 29. A second shaft clutch 29 allows torque to be further transmitted from vapor expander 15 and/or said motor-generator 27 to boost compressor 18. Under various operating conditions, intelligent device control system 37 will engage or disengage individual a shaft clutch 29 to control transfer of mechanical power and to reduce the friction drag of non-utilized or under-utilized devices. For example, in an operating condition where all input power is electric power supplied by a utility grid 34, the shaft clutch 29 functionally located between motor-generator 27 and boost compressor 18 is engaged to allow the transfer of mechanical energy. At the same time, the shaft clutch 29 which is functionally located between vapor expander 15 and motor-generator 27 may, or may not be disengaged according whether or not the motive vapor generated from the heat recovered from the cooling cycle is to be directed to vapor expander 15, ejector compressor 6 or both. If vapor expander 15 is not used, shaft clutch 29 is disengaged.

In a second operating condition, in which all system input energy is thermal and in which no cooling is required, the shaft clutch 29 which is functionally located between motor-generator 27 and boost compressor 18 is disengaged thereby the eliminating the friction drag of the unneeded boost compressor 18. Shaft clutch 29 which is functionally located between vapor expander 15 and motor-generator 27 is engaged to allow the transfer of mechanical energy and the generation of electrical power.

In a third operating condition, requiring cooling output, and in which the transfer of electric power to or from motor-generator 27 is required, both shaft clutches 29 are engaged to allow the transfer of mechanical energy between vapor expander 15, motor-generator 27 and boost compressor 18.

Referring to FIG. 1, FIG. 1A and FIG. 4, vaporized refrigerant at the first high-side pressure enters ejector compressor 6 as the motive fluid and is accelerated thereby, as described by the Venturi Effect, creating a region at a first low-side pressure. Liquid refrigerant controllably flows through refrigerant flow control 30 into refrigerant evaporator 32 which is operating at a second low-side pressure—a pressure equal to, or lower than, the first low-side pressure. Vapor exits refrigerant evaporator 32 at the second low-side pressure and passes through inlet valve 17 to enter boost compressor 18. Boost compressor 18, upon receiving input energy from drive shaft 28, compresses the vapor from the second low-side pressure to the first low-side pressure before discharging it through discharge valve 19. Vapor exiting discharge valve 19 at the first low-side pressure, enters the low pressure region of ejector compressor 6. Once inside ejector compressor 6, the vapor at the first low-side pressure and the motive vapor at the first high-side pressure are mixed and exit ejector compressor 6 at the second high-side pressure. The exiting vapor is further mixed and joined with vapor discharged from vapor expander 15 through discharge control 16.

Thus, in operation, ejector compressor 6 is serially connected with boost compressor 18 such that each compressor accomplishes a portion of the total compression required to raise the pressure of vapor, which leaves refrigerant evaporator 32 at a second low-side vapor pressure, to a second high-side pressure which is the operating pressure of condenser 12. In a system using R410a refrigerant, the second low-side pressure may be at 115 psi, the first low-side pressure may be at 200 psi and the second high-side pressure may be at 400 psi. Under certain operating conditions, it is desirable to functionally deactivate ejector compressor 6 by closing two-way vapor flow control 5. Under such conditions, boost compressor 18 accomplishes all of the compression required.

Referring to FIG. 1 and FIG. 3, the combined vaporized refrigerant from ejector compressor 6 and vapor expander 15, enters the vapor side of heat exchanger/muffler 7 and continues to condenser 12. Condenser fan 13 draws air from outside the occupied compartment and circulates it across condenser 12 to cool and liquefying the refrigerant. Once liquified, the refrigerant enters the liquid refrigerant receiver 20 and exists in two separate circuits—a first motive fluid circuit and a second cooling circuit. Refrigerant following a first motive fluid circuit enters refrigerant pump 8 which increases the pressure from the second high-side pressure to the first high-side pressure. Upon exiting refrigerant pump 8, the liquid refrigerant enters the liquid side of said Heat Exchanger/Muffler 7 which, being in thermal communication with the vapor exiting ejector compressor 6, transfers heat to the liquid refrigerant.

Upon exiting heat exchanger/muffler 7, the now heated refrigerant enters boiler 43. Under conditions where a preferred source of thermal input energy has raised the temperature of the heat transfer fluid of high temperature loop 1 to a point exceeding that of the refrigerant exiting heat exchanger/ muffler 7, the refrigerant which exits heat exchanger/muffler 7 remains a liquid. Under conditions where the temperature of the heat transfer fluid of high temperature loop 1 is equal to or lower than the temperature of the refrigerant exiting heat exchanger/muffler 7, heat exchanger/muffler 7 acts as a boiler and the refrigerant exits as a vapor. Therefore, the system high-side pressure is determined by the total amount of heat which enters the first motive fluid circuit. Under some operating conditions all heat is heat recovered from the air conditioning cycle and is gained through heat exchanger/muffler 7. In other operating conditions, heat is gained from the air conditioning system through heat exchanger/muffler 7 and is further gained from high temperature loop 1 through boiler 43. Under all conditions, intelligent device control system 37 regulates the flow rate of refrigerant pump 8 to ensure the optimum rate of thermal energy transfer within heat exchanger/muffler 7 and/or boiler 43.

Referring to FIG. 1 and FIG. 1A, refrigerant exiting liquid refrigerant receiver 20 following a second cooling circuit, flows through the liquid side of sub-cooling heat exchanger 21 before entering refrigerant flow control 30. This refrigerant, which is at the second high-side vapor pressure, enters refrigerant flow control 30 and is restrictively metered to refrigerant evaporator 32 at the second low-side vapor pressure. Cooling fan 33 draws air from the occupied cabin and circulates it so as to transfer sensible and latent heat which results in the vaporization of the refrigerant in refrigerant evaporator 32. The now-vaporized refrigerant is drawn past inlet valve 17 and into boost compressor 18 to complete the cooling cycle.

Intelligent power control system 35 regulates the input and distribution of externally and internally generated electric power. It ensures that available power is drawn optimally but not excessively from external sources such as alternator 31 which may safety and reliably deliver an amount of power which varies widely depending on such factors as the temperature and the speed of the engine to which it is connected. Similarly, the amount of power which may safety and reliably be drawn from the utility grid 34 may vary according to the quality and robustness of the connection and circuit. A further task of intelligent power control system 35 is to regulate the charging and discharging of electrical power storage 36 and to command the electrical power generating capacity of motor-generator 27 to make up any difference that may exist between the total amount of electrical power which is available from external sources and that which is required to operate the system components. The tables and examples below illustrate the separate and combined functionality of the intelligent power control system 35 and the intelligent device control system 37 when applied to a long-haul truck application.

TABLE 2

PRIORITY FOR ELECTRICAL POWER USE

| USE | PRIORITY |
|---|---|
| Immediate HVAC system components (pumps, controls, fans, etc) | 1 |
| Charging of system storage battery | 2 |
| Beneficially offset non-waste heat thermal source | 3 |
| External, non-system electrical need (charge engine starting battery, feed utility power grid) | 4 |

TABLE 3

ELECTRICAL SOURCE PRIORITIZATION LOGIC BY APPLICATION

| SOURCE | MOBILE VEHICLE PRIORITY | LAND-BASED PRIORITY |
|---|---|---|
| System generated from waste heat | 1 | 1 |
| Utility grid connection | 2 | 4 |
| Propulsion engine alternator | 3 | N/A |
| System battery storage | 4 | 3 |
| System generated from fuel-fired heat | 5 | 5 |
| Solar PV | N/A | 2 |

TABLE 4

FORMULAS TO DETERMINE TOTAL AVAILABLE ELECTRICAL POWER

| | |
|---|---|
| Utility Grid Connection | connection voltage X amperage limit |
| Propulsion Engine Alternator | maximum power extractable without reducing output voltage below a defined threshold |
| System Battery Storage | (battery power storage capacity X state-of-charge) - reserve capacity required |
| System Generated Power | (Maximum system energy capacity - energy required for non-electrical HVAC) X electrical energy conversion efficiency |

EXAMPLES

Typical sources of energy input for Class 8 truck in various operating environments System COP=total system capacity/non-waste heat energy input

EXAMPLE 1

| | |
|---|---|
| Operation Condition: | Engine off at rest stop in hot climate-no utility grid connection |
| Air Conditioning Requirement: | 3 kW |
| Heating Requirement: | NONE |
| System COP*: | 0.92 |
| Non-Waste Energy Input Required: | 3.25 kW |
| Thermal Sources: | Fuel-fired heat* - 3.10 kW Recovered air-conditioning heat - 0.50 kW |
| Electrical Sources: | System generated from fuel-fired heat - 0.80 kW Stored energy from battery* - 0.15 kW |

EXAMPLE 2

| | |
|---|---|
| Operation Condition: | Engine off at rest stop in hot climate-with utility grid connection |
| Air Conditioning Requirement: | 3 kW |
| Heating Requirement: | NONE |
| System COP*: | 2.44 |
| Non-Waste Energy Input Required: | 1.23 kW |
| Thermal Sources: | Recovered air-conditioning heat - 0.20 kW |
| Electrical Sources: | Utility Grid* - 1.23 kW |

| EXAMPLE 3 | |
|---|---|
| Operation Condition: | Engine off at rest stop in cold climate-no utility grid connection |
| Air Conditioning Requirement: | NONE |
| Heating Requirement: | 2 kW |
| System COP*: | 0.93 |
| Non-Waste Energy Input Required: | 2.15 kW |
| Thermal Sources: | Fuel-fired heat* - 2.00 kW |
| Electrical Sources: | Stored energy from battery* - 0.15 kW |

| EXAMPLE 4 | |
|---|---|
| Operation Condition: | Slow traffic in hot climate |
| Air Conditioning Requirement: | 5.30 kW |
| Heating Requirement: | NONE |
| System COP*: | 5.05 |
| Non-Waste Energy Input Required: | 1.05 kW |
| Thermal Sources: | Waste heat - 3.90 kW |
| | Fuel-fired heat* - 0.53 kW |
| | Recovered air-conditioning heat - 0.35 kW |
| Electrical Sources: | Propulsion engine alternator* - 0.52 kW |
| | System generated from heat - 0.35 kW |

| EXAMPLE 5 | |
|---|---|
| Operation Condition: | Highway speed in hot climate |
| Air Conditioning Requirement: | 6.40 kW |
| Heating Requirement: | NONE |
| System COP*: | Infinite |
| Non-Waste Energy Input Required: | 0.00 kW |
| Thermal Sources: | Waste heat - 7.50 kW |
| | Recovered air-conditioning heat - 0.50 kW |
| Electrical Sources: | System generated from waste heat - 1.45 kW |

| EXAMPLE 6 | |
|---|---|
| Operation Condition: | Highway speed in cold climate |
| Air Conditioning Requirement: | NONE |
| Heating Requirement: | 2.4 kW |
| System COP*: | Infinite |
| Total Energy Input Required: | 0.00 kW |
| Thermal Sources: | Waste heat - 3.20 kW |
| Electrical Sources: | System generated from waste heat - 0.80 kW |

Additional Embodiments

Figure 2:
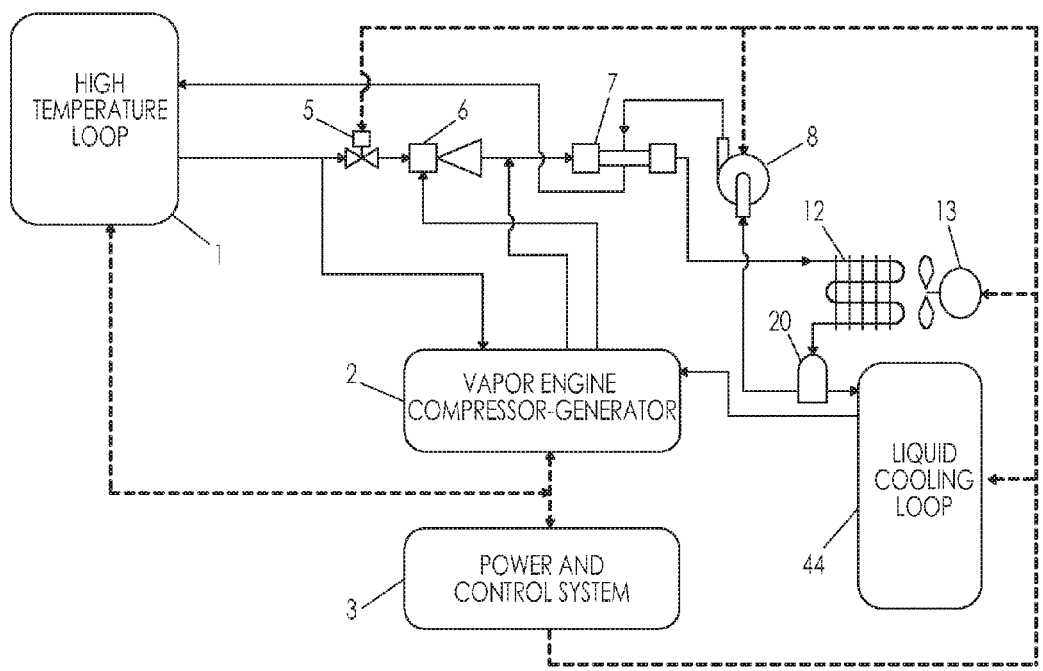
FIG. 2 is a block diagram of a second embodiment of a Mechanically Enhanced Ejector HVAC and Electric Power Generation System.
Figure 2A:
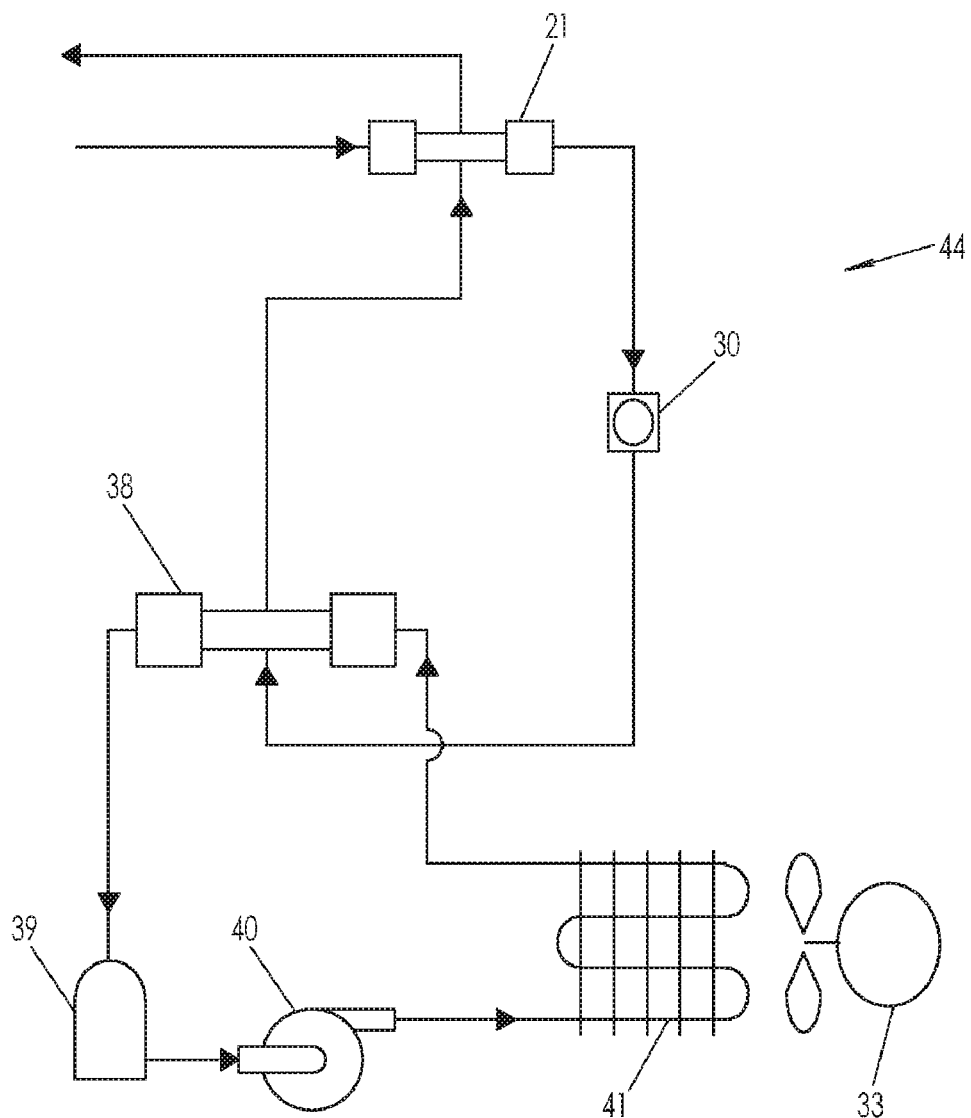
FIG. 2A is a block diagram of a single zone Liquid Cooling Loop according to the second embodiment.

Referring to FIG. 2, FIG. 2A and FIG. 1A, in a second embodiment, direct expansion cooling loop 4 is replaced with a circulating liquid cooling loop as shown in FIG. 2 and FIG. 2A. In this embodiment, refrigerant evaporator 32, which is a refrigerant-air heat exchanger in the first embodiment, is replaced with refrigerant evaporator 38-a refrigerant-liquid heat exchanger. A suitable liquid heat transfer solution, such as a 40/60 mixture of propylene glycol and water, is circulated within a close loop by low temperature circulation pump 40 which is typically a centrifugal pump magnetically coupled to a high-efficiency, long-life and variable-speed motor. Expansion tank 39 accommodates a change in the volume of the liquid due to expansion and contraction. Liquid-air heat exchanger 41 transfers heat from air, which is actively circulated an occupied compartment by cooling fan 33, to the chilled liquid heat transfer solution.

A third embodiment provides for a plurality of direct expansion cooling loop 4 to be connected in the typical manner to the Mechanically Enhanced Ejector HVAC and Electric Power Generation System of FIG. 1 such that multiple zones may be created. Each zone may or may not be located in the same occupied compartment and may or may not be controlled separately from any other zone.

A fourth embodiment provides for a plurality of the liquid cooling loop 44 to be connected in the typical manner to the Mechanically Enhanced Ejector HVAC and Electric Power Generation System of FIG. 2 such that multiple zones may be created. Each zone may or may not be located in the same occupied compartment and may or may not be controlled separately from any other zone.

Figure 6:
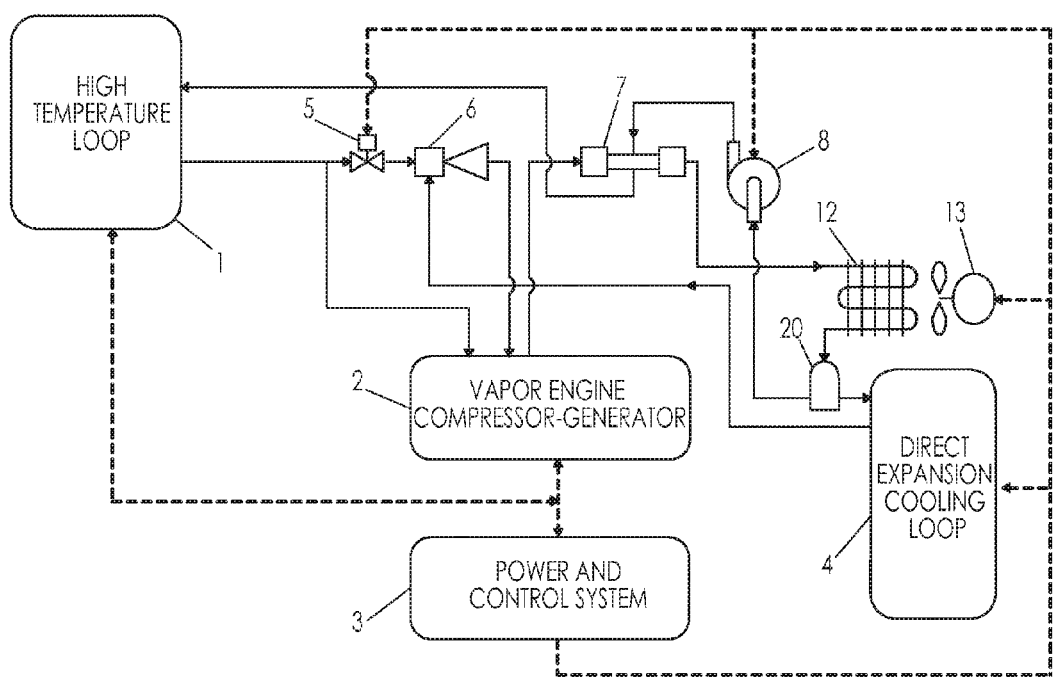
FIG. 6 is a block diagram of a fifth embodiment of a Mechanically Enhanced Ejector HVAC and Electric Power Generation System.
Figure 7:
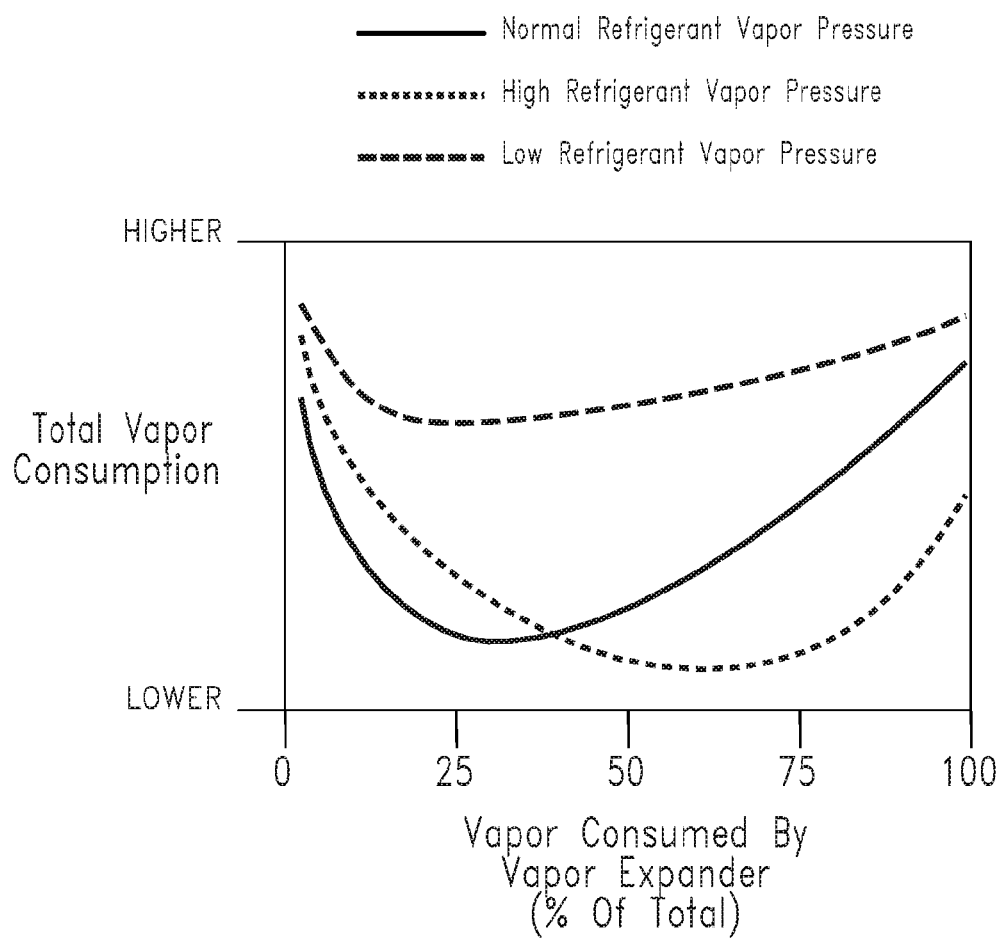
FIG. 7 is a chart showing the effect on total system vapor consumption at various pressures, when the ratio of the vapor consumed by the vapor expander is changed relative to the vapor consumed by the ejector compressor.
Figure 8:
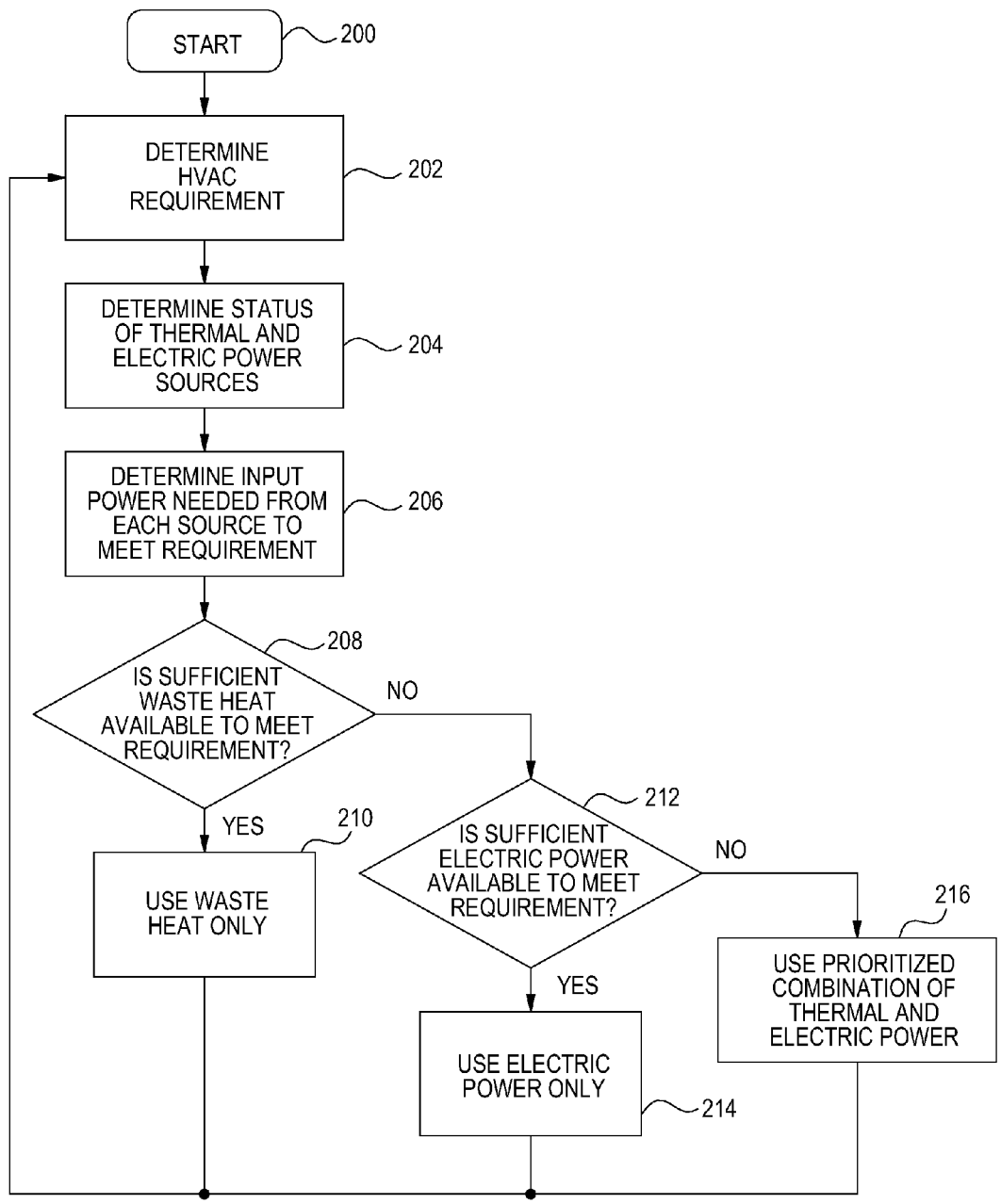
FIG. 8 is a flow diagram of a first level of one type of logic used by the Intelligent Power Control System in the determination of the optimum input power source.

FIG. 6 shows a fifth embodiment in which the ejector compressor 6 is operably connected to refrigerant evaporator 32 so as to receive vaporized refrigerant at the second low-side pressure. Boost compressor 18 is connected in-line between the discharge of ejector compressor 6 and the inlet of condenser 12 such that vapor exiting ejector compressor 6 at a second high-side pressure enters boost compressor inlet valve 17 and is increased to a third high-side pressure before exiting boost compressor discharge valve 19 to condenser 12. The third high-side pressure is greater than the second high-side pressure but lower than the first high-side pressure. In this embodiment the capacity of boost compressor 18 is sufficient to accommodate and compress the sum of the motive fluid refrigerant vapor and the evaporator refrigerant vapor.

Figure 9:
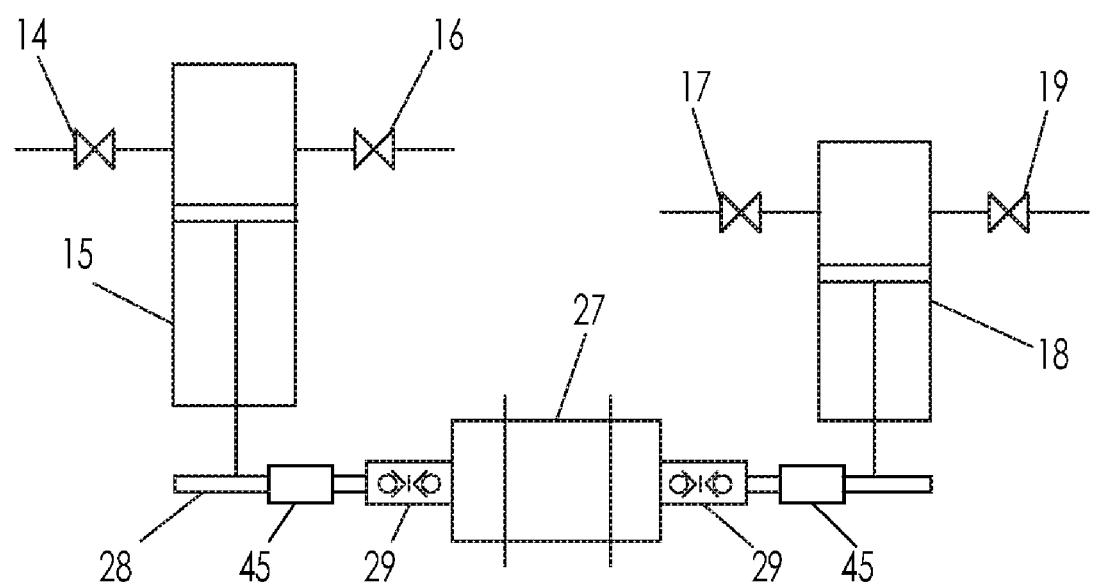
FIG. 9 is a block diagram of a Vapor Engine Compressor-Generator which includes speed reducer/increasers in a sixth embodiment of a Mechanically Enhanced Ejector HVAC and Electric Power Generation System.

A sixth embodiment as shown in FIG. 9 adds one or more speed reducer/increasers 45 to drive shaft 28 of the Vapor Engine Compressor-Generator shown in FIG. 4. such that the rotational speed of the shaft input is increased or decreased relative to the rotational speed of the shaft output. The speed reducer/increaser may be constructed in a planetary or other suitable gear arrangement, or may be of a magnetic type such as those sold by Magnomatics, Sheffield, UK and others.

Alternative Embodiments

Alternative embodiments of the invention feature different sources, and combinations of sources, of input thermal and electric energy. For example, solar thermal and solar electric energy may be used as input power to this invention and may be collected from virtually any type of concentrated or non-concentrated solar collectors. Embodiments incorporating certain types of collectors, such as concentrated solar thermal collectors, typically operate at higher or lower temperature making it desirable to use a refrigerant of different vapor pressure and to optimize the relative capacity of various components so as to match the physical properties of those refrigerants.

The effective utilization of waste heat and the ability to supplement waste heat with other, non-waste heat sources is an important advantage of this invention. There are many potential sources of waste and non-waste heat which can be used alone or in combination to provide thermal input energy in various alternative embodiments. Alternative embodiments may include heat recovered from mechanical and electrical sources as well as chemical processes. For example, in an application of the invention in a manufacturing facility, there is no propulsion power source but there may be multiple alternative sources of waste heat and such sources may be emitting heat at different temperatures. In such a case, the heat is most efficiently collected through heat exchangers that are arranged sequentially by increasing temperatures. Furthermore, it is understood that in certain applications it may be desirable to add a phase change material or other suitable means to store, shift or regulate thermal energy for later use.

The ability to generate electric power, and in some embodiments, store and recover that power, is a further important advantage of this invention. Therefore, alternative embodiments may include different means of storing electric energy and may electrically integrate the storage with other power producing or consuming devices. For example, an electric vehicle may have a battery bank which serves as the storage means for both this invention and the motive power for the vehicle itself. Furthermore, it is understood that, by altering the relative capacity of certain components in the invention, it is possible to alter the maximum electric power generating capacity of the system relative to the maximum cooling capacity of the system.

Alternative embodiments of the invention may feature a vapor expander 15 and/or a boost compressor 18 of any of a number of reciprocating and non-reciprocating types. Additionally, vapor expander 15 and boost compressor 18 may or may not be of the same type. For example, some possible non-reciprocating vapor expanders include scroll, rolling piston, Wankel, gerotor, rotary vane and various turbines. Many suitable reciprocating vapor expanders are known and include compounding, multiple expansion, uniflow and many variations of these established designs. Similarly, there are many well known refrigeration compressors which may suitably serve as the boost compressor in this invention including, reciprocating, scroll, rotary piston, rotary vane, screw, gerotor, wobble plate, centrifugal and others.

Certain aspects of the power generating performance of this invention are limited by the Carnot efficiency of the operating conditions. Therefore, alternative embodiments will be adaptations of the invention which are suited to specific installations and maximize the Carnot efficiency by minimizing the condensing temperature. Alternative embodiments which may maximize Carnot efficiency include the incorporation of water-cooled condensers, ground source condensers and condensers that are in thermal communication with a storing or non-storing heat sink such as a phase change material.

ADVANTAGES

From the description above, a number of advantages of some embodiments of my Mechanically Enhanced Ejector HVAC and Electric Power Generation System become evident. These advantages include the fact that it;
(a) produces air conditioning from low-grade waste heat from solar collectors and other sources at a higher COP than absorption cooling systems and without the need for a water-cooled condenser.
(b) efficiently and reliably uses low-grade waste heat as a motive energy to provide cooling, heating and electric power.
(c) improves efficiency and reliability by using a non-waste heat thermal energy sources to supplement or replace the waste heat source(s) when insufficient waste heat is available to entirely meet the HVAC load.
(d) uses waste and or/non-waste thermal energy to generate electric power for internal and external consumption.
(e) uses the heat extracted from the conditioned air during the cooling process to produce mechanical torque to drive a compressor.
(f) increases the COP of the jet ejector cooling circuit with a mechanical boost compressor powered from the same thermal energy input source.
(g) is capable of providing vehicles with maximum HVAC capacity on a continuous basis without running an internal combustion engine and while requiring only a small fraction of electrical energy storage capacity of an electrically-powered compressor.
(h) can operate entirely from externally-supplied electricity with a COP equal to, or better than, that of a conventional pure-electric air conditioning system due to its ability to capture and utilize the heat of compression as an assisting motive force.
(i) does not require an external source of electric power input for continuous operation.

CONCLUSION, RAMIFICATION AND SCOPE

Accordingly, it can be seen that my Mechanically Enhanced Ejector HVAC and Electric Power Generation System can be used to reduce or entirely eliminate the running cost of air conditioning in any installation where waste heat is available in sufficient quantity.

On long-haul Class 8 trucks, one system can be used to replace both the engine-driven on-highway and battery-powered or auxiliary engine-powered no-idle air conditioning systems. Because the invention is powered by the waste heat produced by the propulsion engine during highway travel, no additional drag is placed on the engine and fuel efficiency is improved in on-road use. During no-idle operation when the propulsion engine is shut down, a fuel-fired hydronic heater provides all the input power needed for full cooling capacity and continuous operation without the cost, weight, maintenance or recharge requirement of a large battery bank. Additionally, in particularly cold environments or under other conditions when an external source of electric power is required (for example; to charge an engine starting battery), the invention may be used to produce that power.

At manufacturing and commercial sites, the invention uses the heat generated as a by-product of many manufacturing processes to fulfill HVAC requirements that would otherwise require the purchase of additional energy. Particularly beneficial in these installations is the fact that, unlike current single-stage absorption chillers and non-boost enhanced jet ejector cooling systems, the invention will continue to operate efficiency and reliably from waste heat as low as 80 C. and do so without the use of a water-cooled condenser.

In applications using solar thermal as an input energy source, the ability of the invention to use low-grade heat and to supplement that heat with a secondary source only to the extent needed to meet the required HVAC capacity, allows even the relatively small amounts of solar heat available in the early and late hours to be captured and utilized.

Although the description above includes many specific details, these should not be construed as limiting the scope of the embodiments but merely as providing illustrations of some of the presently preferred embodiments. Thus, the scope of the embodiments should be determined by the appended claims and their legal equivalent rather than by the examples given.

I claim:
1. An ejector cycle system comprising:
(a) a source of thermal energy,

(b) a first heat exchanger for transferring said thermal energy to a refrigerate to create a vapor at a first high-side pressure, (c) a vapor expander having an inlet port and an outlet port, said inlet port being in fluid communication with said first heat exchanger so as to receive said vapor at a first high-side pressure; a means to expand said vapor at a first high-side pressure to a second high-side pressure while extracting mechanical energy; a discharge port to discharge said expanded refrigerant at the said second high-side pressure, (d) a motor-generator operably coupled to receive said mechanical energy from said vapor expander and to controllably convert none or some portion of said mechanical energy to electrical energy and, with the application of electric power from an external source, to create mechanical energy, (e) a refrigerant compressor operably coupled to receive said mechanical energy from said motor-generator; an inlet port to receive a refrigerant vapor at a second low-side pressure; a compression means to use said mechanical energy to elevate said vapor at a second low-side pressure to a first low-side pressure; a discharge port to discharge said vapor at a first low-side pressure, (f) an ejector compressor, including a primary nozzle in fluid communication with said first heat exchanger so as to receive said vapor at a first high-side pressure; a mixing region which uses the Venturi Effect to create a low pressure zone: a second inlet port in fluid communication with said mixing region and in further fluid communication with said refrigerant compressor discharge port so as to receive said vapor at a first low-side pressure: a third discharge port to discharge vapor at a said second high-side pressure, said second high side pressure being lower than said first high-side pressure and equal to, or greater than said first low-side pressure, (g) a condenser having an inlet port and an outlet port; the inlet port being in fluid communication with said ejector compressor third discharge port and further, in fluid communication with said vapor expander discharge port so as to receive said expanded vapor at a second high-side pressure, (h) a pressure boosting liquid refrigerant pump in fluid communication with said condenser outlet port so as to receive said condensed liquid refrigerant at a second high-side pressure; a means to use mechanical energy to increase said second high-side pressure to said first high-side pressure, a discharge port in fluid communication with said first heat exchanger, (i) a pressure reducing refrigerant flow control having an inlet port and an outlet port, the inlet port in fluid communication with said condenser outlet port so as to receive said condensed liquid refrigerant at a second high-side pressure, an outlet port to controllably discharge liquid refrigerant at the said second low-side pressure, (j) a refrigerant evaporator having an inlet port and outlet port, the inlet port in fluid communication with the said refrigerant flow control outlet port so as to receive said liquid refrigerant at a second low-side pressure, the outlet port in fluid communication with the said refrigerant compressor inlet port.

2. The ejector cycle system of claim 1 which further includes an additional heat exchanger which provides thermal communication between a first fluid and a second fluid, said first fluid being a liquid refrigerant at a first high side pressure and said second fluid being a vapor discharged from a compressor.

3. The ejector cycle system of claim 1 which further includes an intelligent control system which adjusts the flow of fluid through the system during operation in response to changes in temperature, vapor pressure, load and other factors to produce the maximum mechanical power from the least thermal input.

4. The ejector cycle system of claim 3 which further includes an intelligent control system which determines the available sources of thermal and electric input energy and prioritizes their use based on pre-defined parameters.

5. The ejector cycle system of claim 4 which further includes an intelligent control system which may, under certain pre-defined conditions, supply electric power to the said motor-generator to reduce or eliminate the need for external thermal energy input.

6. The ejector cycle system of claim 5 which further includes an intelligent control system which may, under certain pre-defined conditions, use electric power produces by the said motor-generator to reduce or eliminate the need for an external electric energy input.

7. The ejector cycle system of claim 1 further including a high temperature heat transfer loop comprising;
(a) a heat transfer fluid in fluid communication with said first heat exchanger and said source of thermal energy,
(b) a circulating pump having an inlet port and a discharge port.

8. The ejector cycle system of claim 4 which further includes a means to store electric energy, said means being in electrical communication with said motor/generator.

9. The ejector cycle system of claim 4 which further includes a means to store thermal energy, said means being in thermal communication with said first heat exchanger.

10. The ejector cycle system of claim 1 wherein the said vapor expander is of a type selected from a list which includes reciprocating piston, scroll, Wankel, rotary piston, rotary vane, gerotor, wobble piston, turbine, reaction turbine and impulse turbine.

11. The ejector cycle system of claim 1 wherein the said refrigerant compressor is of a type selected from a list which includes reciprocating piston, scroll, Wankel, rotary piston, rotary vane, gerotor, wobble piston, liquid piston and centrifugal.

12. The ejector cycle system of claim 1 which includes a plurality of said pressure reducing refrigerant flow controls and a plurality of said refrigerant evaporators.

13. The ejector cycle system of claim 5 wherein the said motor/generator is a permanent magnet brushless type.

14. The ejector cycle system of claim 13 which further includes an electronic control means to commutate the said permanent magnet type brushless motor-generator to produce mechanical energy.

15. The ejector cycle system of claim 14 in which the said electronic control means further acts as an active rectifier which is in electric communication with the said motor-generator to controllable convert mechanical energy to an electric voltage and current.

16. The ejector cycle system of claim 7 further including a second heat exchanger to transfer thermal energy from said heat transfer fluid to air.

17. The ejector cycle system of claim 7 wherein the said source of thermal energy is a plurality of sources.

18. The ejector cycle system of claim 17 wherein at least one of the said sources of thermal energy is waste heat produced from a chemical process.

19. The ejector cycle system of claim 17 wherein at least one of the said sources of thermal energy is non-waste heat produced from a chemical process.

20. The ejector cycle system of claim 19 wherein at least one of the said sources of thermal energy is solar energy.

21. The ejector cycle system of claim 17 wherein at least one of the said sources of thermal energy is mechanical resistance.

22. The ejector cycle system of claim 17 wherein at least one of the said plurality of sources of thermal energy is an internal combustion engine and further, wherein at least one of the said plurality of sources of thermal energy is a fossil-fuel fired heater.

23. The ejector cycle system of claim 1 wherein;
   (a) the said refrigerant compressor is operably coupled to receive said mechanical energy from said motor-generator; an inlet port to receive a refrigerant vapor at a second high-side pressure; a compression means to use said mechanical energy to elevate said vapor at a second high-side pressure to a third high-side pressure; a discharge port to discharge said vapor at a third high-side pressure,
   (b) the said ejector compressor including a primary nozzle in fluid communication with said first heat exchanger so as to receive said vapor at a first high-side pressure; a mixing region which uses the Venturi Effect to create a low pressure zone: a second inlet port in fluid communication with said mixing region and in further fluid communication with said refrigerant evaporator outlet port so as to receive said vapor at a second low-side pressure: a third discharge port to discharge vapor at a said second high-side pressure, said second high side pressure being lower than said first high-side pressure less than said third high-side pressure,
   (c) a condenser having an inlet port and an outlet port; the inlet port being in fluid communication with said refrigerant compressor discharge port and further, in fluid communication with said vapor expander discharge port so as to receive said expanded vapor at a second high-side pressure.

24. A mechanically boosted jet ejector cooling system comprising;
   (a) a high temperature heat transfer loop including;
      a heat transfer fluid circulated by a pump, and
      a single or plurality of heat sources in thermal communication with said heat transfer fluid, and
      a heat exchange boiler to transfer heat from said heat transfer fluid to a refrigerant circuit, and
   (b) a thermal generator-compressor including;
      a vapor expander to convert vapor expansion energy to mechanical torque, and
      a motor-generator coupled to the said vapor expander so as to receive and transfer said mechanical torque, and further capable of controllably converting a portion of said mechanical torque to an electrical voltage, and further capable of receiving electric power and controllably converting said electric power to mechanical torque, and
      a gas compressor, having an inlet port and an outlet port and coupled to receive and use said mechanical torque from said motor-generator to compress a gas, and
   (c) a refrigerant circuit including;
      a jet ejector compressor having a motive fluid inlet port, an intermediate pressure inlet port and a discharge port, and
      a refrigerant condenser, and
      a liquid refrigerant circulating pump, and
   (d) a cooling loop including;
      a refrigerant flow control, and
      a refrigerant evaporator heat exchanger having an inlet port and an outlet port, such that;
   heat from the said heat transfer fluid enters the said refrigerant circuit through the said heat exchange boiler and vaporizes a refrigerant at a high pressure, the said vapor expander being in fluid communication with the said heat exchange boiler and the said refrigerant condenser such that it may receive a portion of the said refrigerant vapor at a high pressure and expand it to a second intermediate pressure before flowing it to the said refrigerant condenser with the resultant energy difference recovered as mechanical torque such that,
   the said mechanical torque being transferred to the said motor-generator, the said motor generator converting some portion of said mechanical torque to an electrical voltage and transferring a remaining portion of said mechanical torque to the said gas compressor and,
   the said gas compressor inlet port being in fluid communication with the said refrigerant evaporator heat exchanger outlet port and, the said gas ejector outlet port being in fluid communication with the said jet ejector compressor intermediate pressure inlet port, uses the said remaining mechanical torque to compress a refrigerate vapor leaving the said refrigerant evaporator at a low pressure to a first intermediate pressure, and further,
   the said jet ejector compressor motive fluid inlet port, in fluid communication with the said heat exchange boiler, receives a portion of the said vaporized refrigerant at a high pressure and, according to the Venturi Effect, combines with vapor entering the said jet ejector compressor intermediate pressure inlet port at a first intermediate pressure and compresses it to a second intermediate pressure and, the said jet ejector compressor discharge port being in fluid communication with the said refrigerant condenser, the said combined vapor at a second intermediate pressure exists the said jet ejector compressor discharge port and is condensed to a liquid in the said refrigerant condenser such that,
   the said liquid refrigerant circulating pump, having an inlet port in fluid communication with the said refrigerant condenser and an outlet port in fluid communication with the said heat exchange boiler, receives a portion of the said condensed liquid refrigerant at a second intermediate pressure and controllably pressurizes it to the said high pressure and transfers it to the said heat exchange boiler, and further,
   the said refrigerant flow control, having an inlet port in communication with the said refrigerant condenser and an outlet port in fluid communication with the said refrigerant evaporator inlet port, receives a portion of the said condensed liquid refrigerant at an second intermediate pressure and controllably meters it to the said refrigerant evaporator inlet port at a low pressure such that,
   heat from an area to be cooled enters the said refrigerant evaporator and boils the said liquid refrigerant at a low pressure thereby converting it to the said refrigerant vapor at a low pressure.

25. The mechanically boosted jet ejector cooling system of claim 24 wherein the said motor-generator may be electrically controlled to convert a greater or lesser portion of the said mechanical torque input energy to an electrical output voltage, and further, may controllably receive and convert electrical power from an outside source to mechanical torque output energy.

26. The mechanically boosted jet ejector cooling system of claim 25 wherein, under certain operating conditions, all of the said motor-generator mechanical torque output is created from said electric power from an outside source.

27. The mechanically boosted jet ejector cooling system of claim 25 wherein said electric power from an outside source includes one or more of a storage battery, utility power grid, internal combustion engine-driven alternator or solar photovoltaic array.

28. The mechanically boosted jet ejector cooling system of claim 24 wherein the said heat sources include one or more of an internal combustion engine cooling system, an internal combustion engine exhaust system, a fuel-fired hydronic heater, an electric resistance heater, a concentrated thermal solar array, a non-concentrated solar thermal array, a geothermal loop or a fluid thermocline.

29. The mechanically boosted jet ejector cooling system of claim 24 which further includes a means to store thermal energy.

30. The mechanically boosted jet ejector cooling system of claim 24 which further includes a means to store electric energy.

31. The mechanically boosted jet ejector cooling system of claim 24 which further includes an intelligent control system which, according to operating conditions, optimizes system performance by adjusting the ratio of the said portion of refrigerant vapor at a high pressure which flows to the said vapor expander relative to that which flows to the said jet ejector compressor.

32. The mechanically boosted jet ejector cooling system of claim 25 which further includes an intelligent control system which, according to operating conditions, optimizes system performance by adjusting the percentage of the said vapor expender output torque which is converted to said electrical output voltage.

33. The mechanically boosted jet ejector cooling system of claim 24 which further includes an intelligent control system which, according to operating conditions, optimizes system performance by increasing or decreasing the amount of refrigerant which enters the said heat exchange boiler by altering the flow rate from the said liquid refrigerant circulating pump.

34. The mechanically boosted jet ejector cooling system of claim 31 in which the said adjusting is accomplished by changing the open dwell and timing of flow control valves which control the flow of vapor to and from the said vapor expander.

35. The mechanically boosted jet ejector cooling system of claim 24 in which said cooling loop includes;
a heat transfer fluid circulated by a pump, and
a refrigerant flow control, and
a refrigerant evaporator heat exchanger in thermal communication with said heat transfer fluid, and
one or a plurality of liquid-air heat exchangers in fluid communication with said heat transfer fluid and in further thermal communication with an area to be cooled such that heat from said area to be cooled is transferred to said heat transfer fluid.

36. The mechanically boosted jet ejector cooling system of claim 24 which further includes one or more speed reducer/increasers functionally located to change the rotational speed of one or more of said vapor expander, said boost compressor and/or said motor-generator relative to the rotational speed of the other.

* * * * *